United States Patent

[11] 3,568,558

| [72] | Inventors | Rene Passa<br>Livry-Gargan;<br>Achille Romoli, Saint-Denis, France |
|---|---|---|
| [21] | Appl. No. | 815,408 |
| [22] | Filed | Apr. 11, 1969 |
| [45] | Patented | Mar. 9, 1971 |
| [73] | Assignee | B.R.G.<br>Deuil-La-Barre, France |
| [32] | Priority | Mar. 25, 1969 |
| [33] | | France |
| [31] | | 6908762 |

[54] ARRANGEMENT CONTROLLING THE ANGLE OF INCLINATION BETWEEN THE MOVABLE BLADE AND THE FIXED BLADE OF SHEARS
3 Claims, 5 Drawing Figs.

[52] U.S. Cl............................................. 83/530,
83/624, 83/636, 83/639
[51] Int. Cl............................................. B26d 5/12
[50] Field of Search............................................. 83/530,
522, 624, 639, 636; 33/186

[56] References Cited
UNITED STATES PATENTS

| 2,931,182 | 4/1960 | Anderson et al............. | 83/624UX |
| 3,131,589 | 5/1964 | Hazelton et al............. | 83/639X |
| 3,181,407 | 5/1965 | Pearson....................... | 83/639X |
| 3,183,756 | 5/1965 | Dehn............................ | 83/530 |
| 3,242,786 | 3/1966 | Giordano...................... | 83/639X |

*Primary Examiner*—Frank T. Yost
*Attorney*—Michael S. Striker

ABSTRACT: Arrangement controlling the angle of inclination between the movable blade and the fixed blade of shears.

An arrangement controlling the angle of inclination or the rake angle between the movable blade and the fixed blade of hydraulically operated shears in accordance with an indicator defining said angle of inclination for predetermined thicknesses and resistances to shearing of the sheets to be cut. Said knob-controlled indicator controls through a cam and a flexible tape the vertical movements in opposite directions of the pilot valves governing the jacks operating the ends of the movable blade of the shears. Further means define the location of the crossing point between the blades of the shears in accordance with the length of the sheet material to be cut.

Patented March 9, 1971 3,568,558
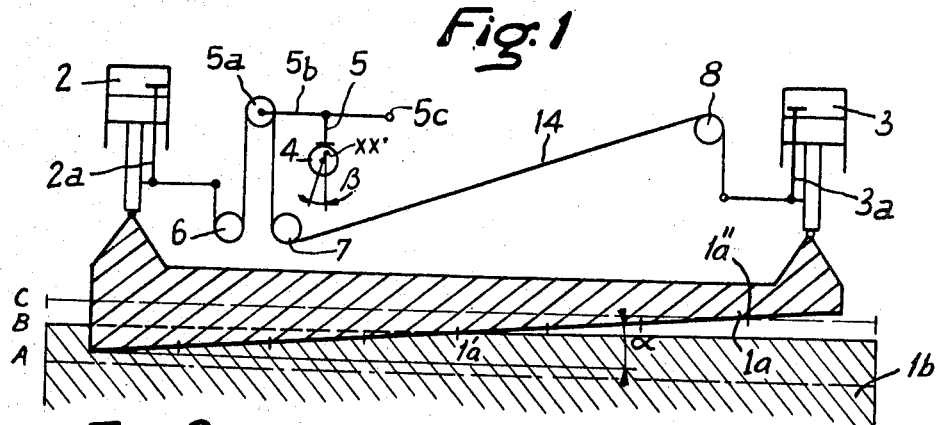
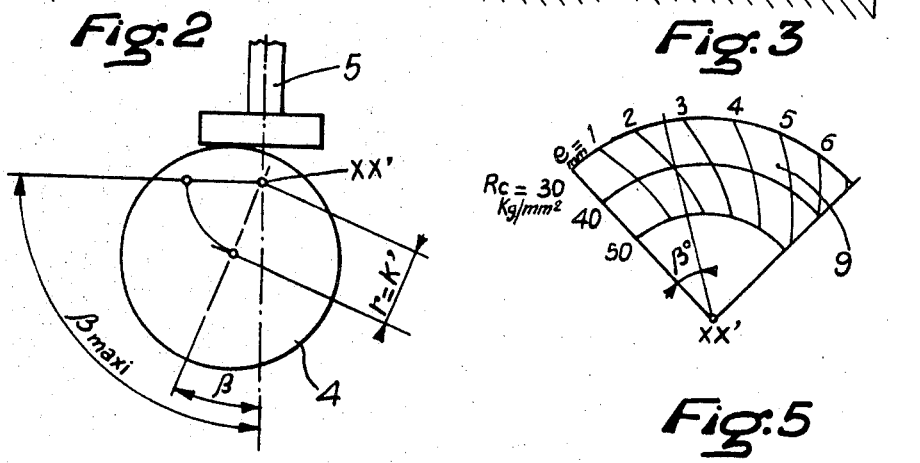
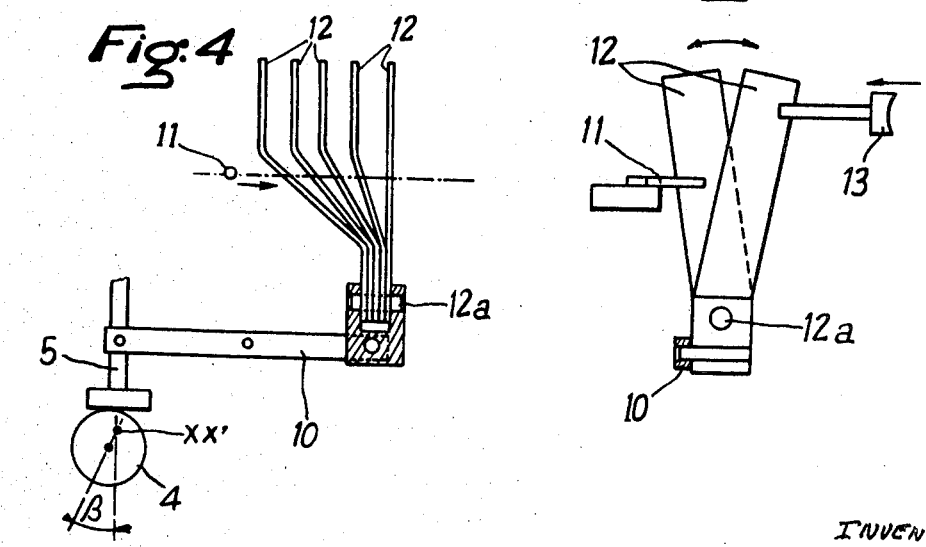
INVENTORS
RENE PASSA
ACHILLE ROMOLI
By Michael J. Striker
Attorney

ARRANGEMENT CONTROLLING THE ANGLE OF INCLINATION BETWEEN THE MOVABLE BLADE AND THE FIXED BLADE OF SHEARS

Our invention has for its object an arrangement for controlling the angle of inclination between the movable blade and the fixed blade of shears.

In order to further the handling of the shears and to allow an easier and speedier operation it is of advantage to control the angle of inclination between the movable blade and the fixed blade through the agency of a single control system defining unequivocally the angle required for a predetermined thickness of sheet and for a predetermined resistance of the sheet against shearing.

It is furthermore of advantage when such a control is obtained to ascertain speedily from an external point the accurate location of the crossing point between the blades along the line of cut, which location depend on the width of the metal sheet. In fact, when the operator cuts small-sized sheets, it is not necessary for the movable blade to execute its maximum stroke as the movable blade may stop on its return stroke at a point where the blades still cross each other. Under such conditions, the rhythm of operation may be considerably increased.

To this end, starting from the hydraulically controlled shears described in the U.s. Pat. No. 3,242,786 in the name of Francois Rene Giordano our invention provides a knob or the like controlling means cooperating with a dial showing the angle of inclination between the movable blade and the fixed blade defined as a function of the thickness of the metal sheet and of the resistance of the latter against shearing, said knob being operatively connected through a cam-controlled mechanism with the pilot valve of each of the jacks controlling the movable blade which assumes thus the inclination given out by the dial.

Further optional features of the invention are as follows:

The cam is constituted by a circular eccentric member cooperating with a plate operatively connected with a lever pivotally secured through one end to a stationary part while its other end carries a pulley, the shifting of said pulley being transmitted to the pilot valves through the agency of a flexible nonelastic tape one end of which passes over a pulley carried by a stationary part and controls the pilot valve urging downwardly one end of the movable blade of the shears while the other end of the tape passes over further pulleys carried by the stationary part and controls the pilot valve engaging the other end of the movable blade to make it go up by a corresponding amount;

the location of the crossing point of the blades is defined by switching means controlling the hydraulic circuit operating the shears, said switching means being carried by a member moving in synchronism with the movable blade and being actuated by a plurality of projections extending into its path;

several of such projections are located in positions corresponding to various intended locations of the crossing point between the blades; and the spacing between the projections varies and depends on the angle of inclination to be given to the movable blade said spacing being controlled by an auxiliary lever associated with the inclination controlling plate; said projections are carried by said lever as a bundle of rods folded along predetermined different angles whereby upon rising or sinking of said bundle with reference to the switching means, there is obtained a modification in the spacing between said projections.

We will now disclose by way of example and with a view to furthering the understanding of the invention an embodiment illustrated in the accompanying drawings wherein:

FIG. 1 is a diagrammatic illustration of the means controlling the angle of inclination of the movable blade.

FIG. 2 is a detail view of the eccentric member of cam controlling said angle of inclination.

FIG. 3 is a diagrammatic illustration of the dial on which may be read the different angles of inclination to be obtained.

FIG. 4 is a diagrammatic illustration of the means selecting the location of the crossing point between the blades.

FIG. 5 is a further view of the arrangement illustrated in FIG. 4.

Turning to FIG. 1, it is apparent that the movable blade 1 is actuated by the jacks 2 and 3 in the manner disclosed in the above-mentioned U.S. Pat. No. 3,242,786 while the pilot valves 2a and 3a control the vertical movements of the corresponding jacks 2 and 3 whereby a modification may be obtained for the angle $\alpha$ defining the inclination of the movable blade 1. It is sufficient to make the pilot valve 2a provide a sinking by a corresponding height while the other pilot valve 3a provides a rising by an equal amount.

To this end the control of the angle $\alpha$ is obtained through an eccentric member or cam 4 connected with a control knob or handle which is not illustrated. The eccentric member 4 cooperates with the plate 5 rigid with a lever 5b. Said lever 5b is pivotally secured to a stationary part of the shears and carries at its free end a pulley 5a. A flexible nonelastic tape 14 made of quenched steel for instance is secured through one end to the pilot valve 2a and passes first over a pulley 6 carried by the stationary section of the shears and then over the pulley 5a carried by the lever and finally over the further pulleys 7 and 8 carried by said stationary section so as to engage finally the pilot valve 3a to which the tape is rigidly secured.

With such an arrangement, the rising and sinking of the pulley 5a obtained by a rotation of the cam 4 leads to corresponding movements of the pilot valves 2 a and 3a in opposite directions. In contradistinction, the cutting stroke of the movable blade 1 does not modify the relative position of the pilot valves 2a and 3a so that the inclination does not vary throughout the operative stroke of the shears.

In order to provide an indication of said angle of inclination through the control knob or handle, the latter cooperates with a scale-carrying dial 9 (FIG. 3) provided with a system of curves defining the angle $\beta$ through which the cam 4 is to be shifted and which is proportional to the desired angle $\alpha$ defining the inclination of the moveable blade 1 for any given thickness of the metal sheet to be cut and for any resistance $Rc$ of the sheet against shearing. Said resistance $Rc$ is obviously a characteristic property of the metal to be cut and possibly of the thermic and the like treatments to which it has been subjected.

In the case of an eccentric member revolving round the axis $xx'$ with an eccentricity $r$ the following relationships are obtained. The law governing the shearing cut is given out by $$F = k \frac{Rc \cdot e^2}{tg\alpha}$$

$F$ being the shearing force $k$ a constant, $Rc$ the resistance against shearing, $e$ the thickness of the metal sheet to be cut and $\alpha$ the slope between the blades.

Assuming $Rc$ and $F$ remain constant, it is possible to write $$tg\alpha = ke^2$$

and assuming $\beta = C.e$
and considering that a limited development of $\cos \beta$ is
$$\cos \eta = 1 - \frac{\beta^2}{2!}$$

it is possible to write $$2(1 - \cos \beta) = \beta^2$$

$$\text{and } tg\alpha = \frac{k}{C^2}\beta_2 = X'(1 - \cos \beta)$$

In order to form the scale on the dial 9 it is sufficient to draw concentric circular sectors the center of which is lies at $xx'$, said circles corresponding to different resistances $Rc$ against shearing (FIG. 3) after which equidistant subdivisions are obtained on each of the circles, which subdivisions correspond to various thicknesses of the sheet to be cut.

With an eccentric member 4 the eccentricity of which $r$ is equal to $k'$ and with a suitable selection of the point of engagement with the plate 5 there is obtained a function $K'(1-\cos\beta) = tg\alpha$ In order to make the stroke of the movable blade match the rake angle and the width of the sheets to be cut there are provided further control means with a view to obtaining a predetermined length of cut as provided by a modification in the location of the crossing point between the blades. Thus according to the length of the return stroke of the movable blade 1a the relative position of the fixed blade 16 and the movable blade 1a may be at the end of the return stroke of the latter as indicated in FIG. 1 at A, B, C, to result in crossing points $1'a$, $1''a$ and so on. To this end, switching means 11 are secured to a member driven by the right-hand end of the movable blade 1a. Said hydraulic or electric switching means are adapted to impinge at a point of their path a stationary projection which stops the downward movement of the movable blade.

In order to obtain different crossing points as desired say at 0.5–1–1.5–2–2.5 or 3 $m$ from the end of the shears independently of the rake angle of the movable blade, a manually controlled arrangement including a pusher knob 13 is provided for a rocking of the selected projection 12 into the path of said switching means 11. There are as many projections 12 as there are crossing points to be foreseen. Said projections form a bundle of rods folded along different angles and pivotally secured at 12a on the auxiliary lever 10 rigid with the plate 5. Consequently a modification in the level of the bundle of projections 12 together with the plate 5 produces a modification in pitch between the projections 12 with reference to the switching means 11. This provides a correcting system wherein the pitch between the projections is modified as required by the inclination given to the movable blade.

We claim:

1. In a shear for cutting material of different thickness and different resistant to shearing, a combination comprising stationary support means; a first knife stationarily mounted on said support means; a second knife inclined at a rake angle relative to said first knife and movably mounted on said support means to cooperate with said first knife to shear material placed between said knives; means connected to said second knife for moving the same along a working stroke and a return stroke; first adjustable means mounted only on said support means and cooperating with said moving means for changing the rake angle of said second knife; switch means operatively connected to said second knife for movement therewith and cooperating with said moving means for controlling the return stroke of the second knife; and second adjustable means located in the path of movement of said switch means and cooperating with the latter to limit the return stroke to thereby determine at the end of the return stroke a crossing point of said knives at a point intermediate the opposite ends of the latter.

2. A combination as defined in claim 1, wherein said moving means comprise a pair of hydraulic jacks mounted on said support means and respectively connected to opposite ends of said second knife, and wherein said first adjustable means comprise a pair of pilot valves respectively cooperating with said hydraulic jacks, a manually adjustable cam mounted on said support means, a lever adjacent said cam and pivotally mounted at one end thereof on said support means, a pulley carried on the other end of said lever, a cam follower engaging said cam and carried by said lever intermediate the ends of the latter, elongated flexible means engaged by said pulley and connected at opposite ends to said pilot valves, and guide means mounted on said support means for guiding said elongated flexible means between the ends thereof in such a manner to cause during deflection of said elongated flexible means by said pulley movement of said pilot valves in opposite directions.

3. A combination as defined in claim 1, wherein said second adjustable means comprise a plurality of members spaced in direction of the movement of said switch means from each other and being selectively movable into the path of said switch means to actuate the latter.